(12) United States Patent
Kawaguchi et al.

(10) Patent No.: US 11,150,689 B2
(45) Date of Patent: Oct. 19, 2021

(54) IMAGE DISPLAY DEVICE

(71) Applicant: PANASONIC INTELLECTUAL PROPERTY MANAGEMENT CO., LTD., Osaka (JP)

(72) Inventors: Satoshi Kawaguchi, Osaka (JP); Keizo Kawakami, Hyogo (JP); Akira Taniguchi, Hyogo (JP); Shuji Yamashita, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 27 days.

(21) Appl. No.: 16/618,030

(22) PCT Filed: Feb. 8, 2019

(86) PCT No.: PCT/JP2019/004555
§ 371 (c)(1),
(2) Date: Nov. 27, 2019

(87) PCT Pub. No.: WO2019/167590
PCT Pub. Date: Sep. 6, 2019

(65) Prior Publication Data
US 2020/0409410 A1 Dec. 31, 2020

(30) Foreign Application Priority Data
Mar. 2, 2018 (JP) .............................. JP2018-037421

(51) Int. Cl.
*G06F 1/16* (2006.01)
*F16M 11/10* (2006.01)
*H04R 5/02* (2006.01)

(52) U.S. Cl.
CPC ......... *G06F 1/1605* (2013.01); *F16M 11/105* (2013.01); *H04R 5/02* (2013.01)

(58) Field of Classification Search
CPC ........ G06F 1/1605; F16M 11/105; H04R 5/02
See application file for complete search history.

(56) References Cited

U.S. PATENT DOCUMENTS 5,978,211 A * 11/1999 Hong ..................... F16M 11/10
361/679.23
2005/0201046 A1 9/2005 Hwang et al.
(Continued)

FOREIGN PATENT DOCUMENTS

CN 202976697 U 6/2013
JP H10-240140 A 9/1998
(Continued)

OTHER PUBLICATIONS

International Search Report and Written Opinion dated Mar. 19, 2019 in International Patent Application No. PCT/JP2019/004555; with partial English translation.
(Continued)

*Primary Examiner* — Andrew L Sniezek
(74) *Attorney, Agent, or Firm* — McDermott Will and Emery LLP

(57) ABSTRACT

An image display device includes a device body having a front surface with a display surface that is substantially rectangular and is for displaying an image; a stand that is placed on a placement surface and supports the device body; a support component that is fixed to the stand, is disposed on a rear surface of the device body, and rotatably supports the device body about a rotation shaft between a horizontal orientation in which the display surface is in a landscape orientation and a vertical orientation in which the display surface is in a portrait orientation; and a speaker that is supported by the support component and is disposed on the rear surface of the device body via the support component. The speaker emits sound toward the placement surface.

9 Claims, 8 Drawing Sheets

(56) References Cited

U.S. PATENT DOCUMENTS

2008/0062099 A1   3/2008   Oshima
2014/0113540 A1   4/2014   Dunn et al.

FOREIGN PATENT DOCUMENTS

| JP | 2003-066934 A | 3/2003 |
| JP | 2003274474 A | 9/2003 |
| JP | 2005-195623 A | 7/2005 |
| JP | 2008154084 A | 7/2008 |
| JP | 2009021731 A | 1/2009 |
| JP | 2009232134 A | 10/2009 |
| JP | 2012-080338 A | 4/2012 |
| WO | 2006/030487 A1 | 3/2006 |

OTHER PUBLICATIONS

Extended European Search Report dated Mar. 22, 2021 in European Application No. 19761248.4.

* cited by examiner

IMAGE DISPLAY DEVICE

CROSS-REFERENCE OF RELATED APPLICATIONS

This application is the U.S. National Phase under 35 U.S.C. § 371 of International Patent Application No. PCT/JP2019/004555, filed on Feb. 8, 2019, which in turn claims the benefit of Japanese Application No. 2018-037421, filed on Mar. 2, 2018, the entire disclosures of which Applications are incorporated by reference herein.

TECHNICAL FIELD

The present disclosure relates to an image display device including a device body that is rotatable with respect to a stand.

BACKGROUND ART

Patent Literature (PTL) 1 discloses a so-called rotatable image display device including a device body that is rotatable with respect to a stand. This type of image display device includes a panel-shaped device body having a substantially rectangular display surface on a front surface thereof, a stand that rotatably supports the device body, and a speaker disposed in the device body. The device body rotates, with respect to the stand, between a horizontal orientation in which the display surface is in a landscape orientation and a vertical orientation in which the display surface is in a portrait orientation.

CITATION LIST

Patent Literature

PTL 1: Japanese Unexamined Patent Application Publication No. 2003-66934

SUMMARY OF THE INVENTION

Technical Problem

The present disclosure provides an image display device capable of limiting a change in how sound from its speaker sounds even when its device body is rotated.

Solution to Problem

A image display device in the present disclosure includes a device body having a front surface with a display surface that is substantially rectangular and is for displaying an image; a stand that is placed on a placement surface and supports the device body; a support component that is fixed to the stand is disposed on a rear surface of the device body, and rotatably supports the device body about a rotation shaft between a horizontal orientation in which the display surface is in a landscape orientation and a vertical orientation in which the display surface is in a portrait orientation; and a speaker that is supported by the support component and is disposed on the rear surface of the device body via the support component. The speaker emits sounds toward the placement surface.

Advantageous Effect of Invention

The image display device according to the present disclosure makes it possible to limit a change in how sound from its speaker sounds even when its device body is rotated.

DESCRIPTION OF EXEMPLARY EMBODIMENT

The inventors have identified the following problem related to the technique described in the column "BACKGROUND ART."

In the image display device of PTL 1, a speaker is, for example, disposed along a lower side (long side) of a device body while the device body is in a horizontal orientation. Thus, upon rotating the device body from the horizontal orientation to a vertical orientation, the speaker is located along either a left long side or a right long side. As a result, the problem arises that a positional relationship between a user and the speaker changes before and after rotating the device body, and the way sound from the speaker sounds to the user also changes.

The present disclosure is based on this observation and the inventors have conceptualized, as a result of their studies, an image display device capable of limiting a change in how the sound from the speaker sounds even when the device body is rotated.

Hereinafter, an embodiment will be described in detail with reference to the drawings when appropriate. However, unnecessarily detailed descriptions may be omitted. For example, detailed descriptions of well-known matters or descriptions of components that are substantially the same as components described previous thereto may be omitted. This is to avoid redundancy and facilitate understanding of the descriptions for those skilled in the art.

Note that the inventors have provided the accompanying drawings and subsequent descriptions to facilitate sufficient understanding of the present disclosure by those skilled in the art, and are thus not intended to limit the scope of the subject matter recited in the claims.

EMBODIMENT

Hereinafter, the embodiment will be described with reference to FIG. 1 to FIG. 9.

1. Overall Configuration of Image Display Device

Figure 1:
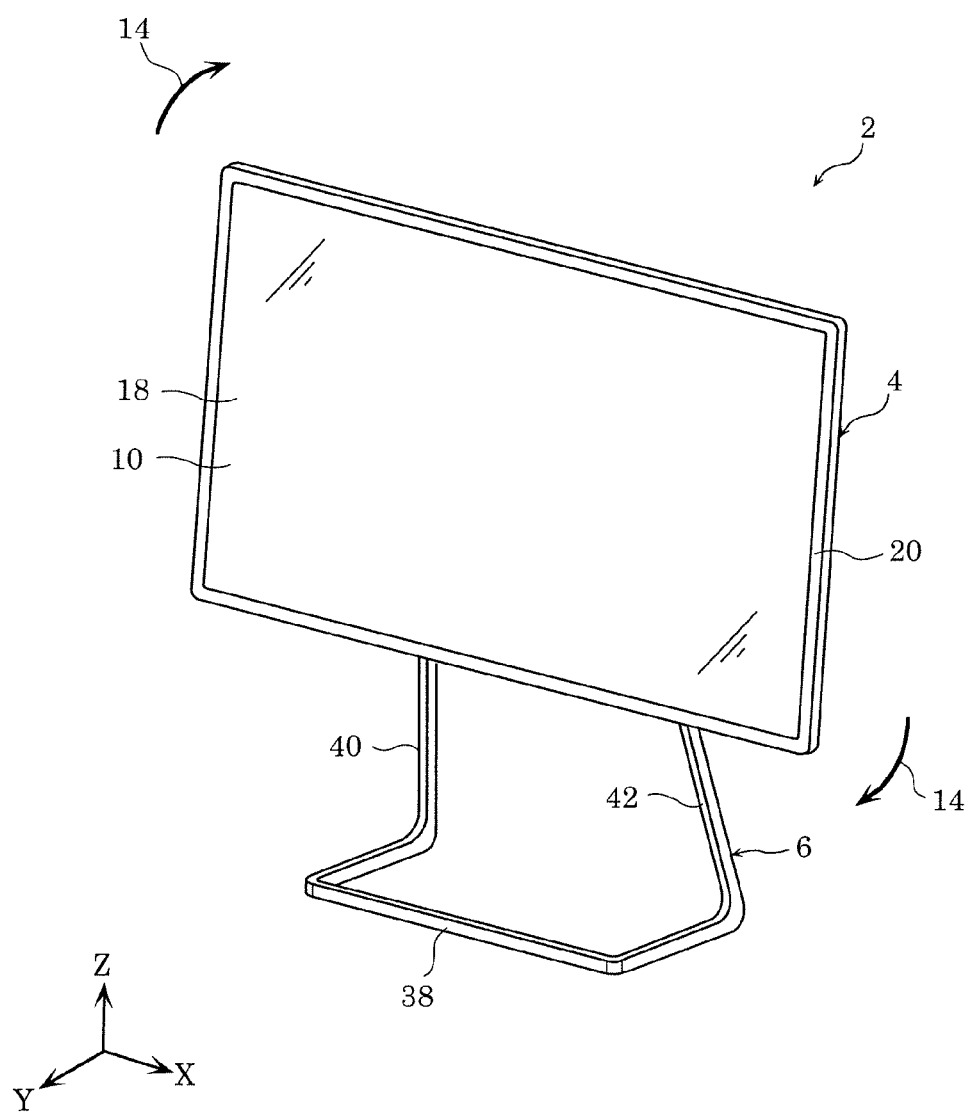
FIG. 1 is a perspective view of a front side of an image display device according to an embodiment.
Figure 2:
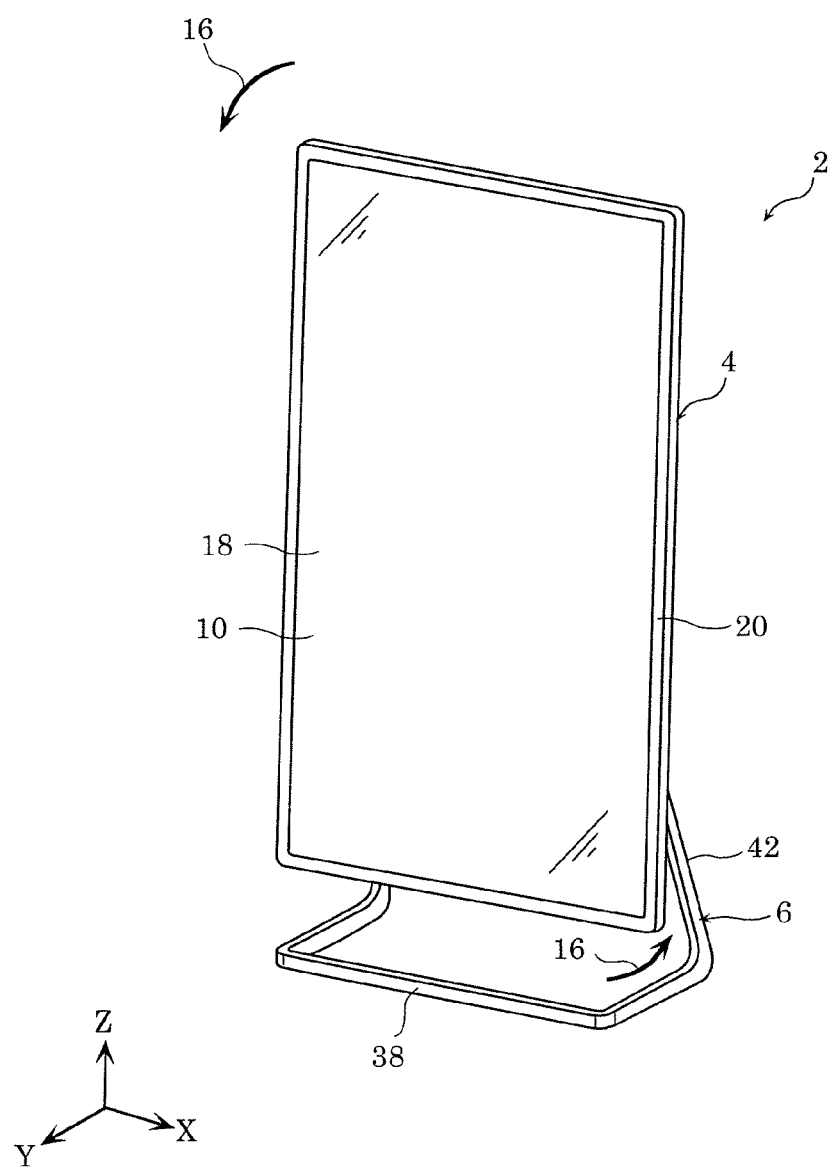
FIG. 2 is a perspective view of the front side of the image display device according to the embodiment in a state in which a device body thereof is rotated 90° away from the state shown in FIG. 1.
Figure 3:
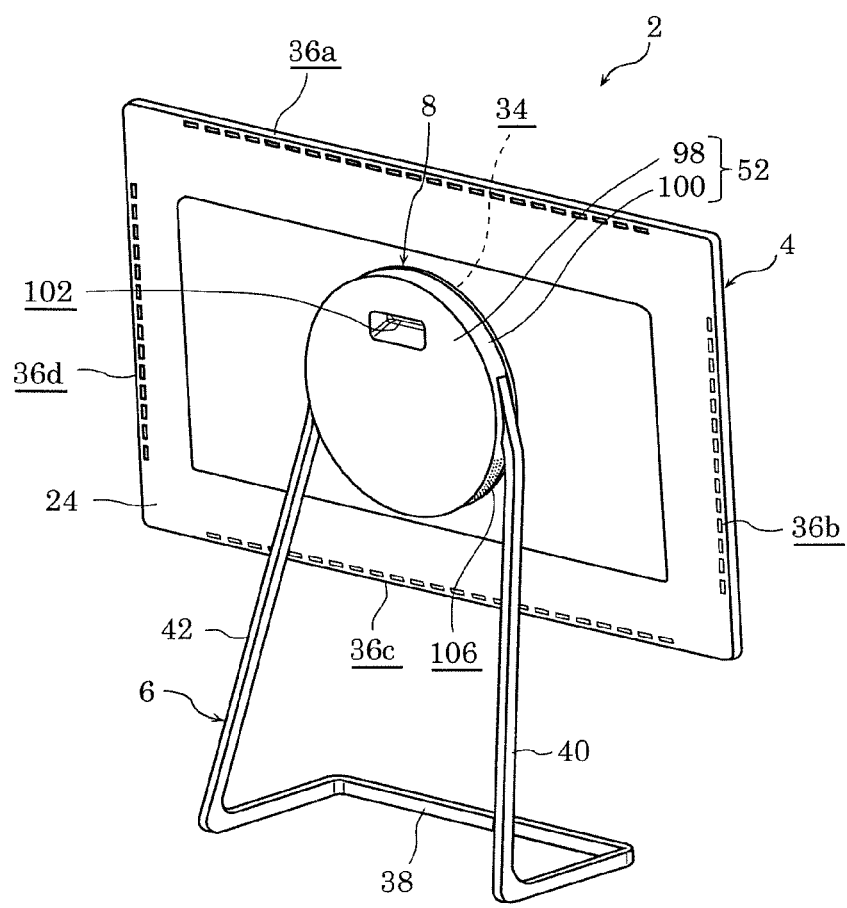
FIG. 3 is a perspective view of a rear side of the image display device according to the embodiment.
Figure 4:
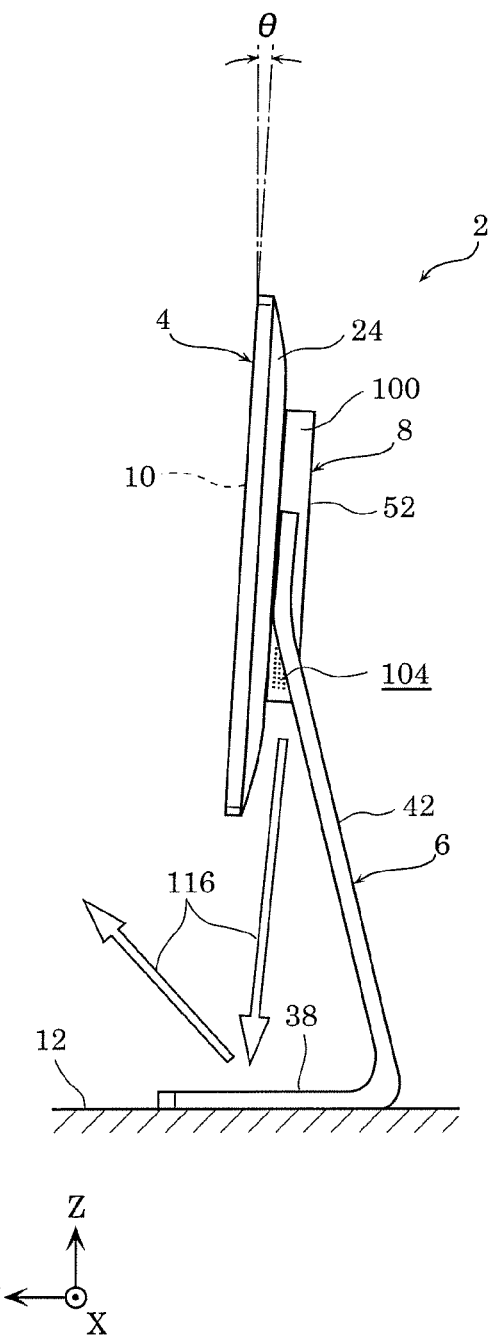
FIG. 4 is a perspective view of a lateral side of the image display device according to the embodiment.
Figure 5:
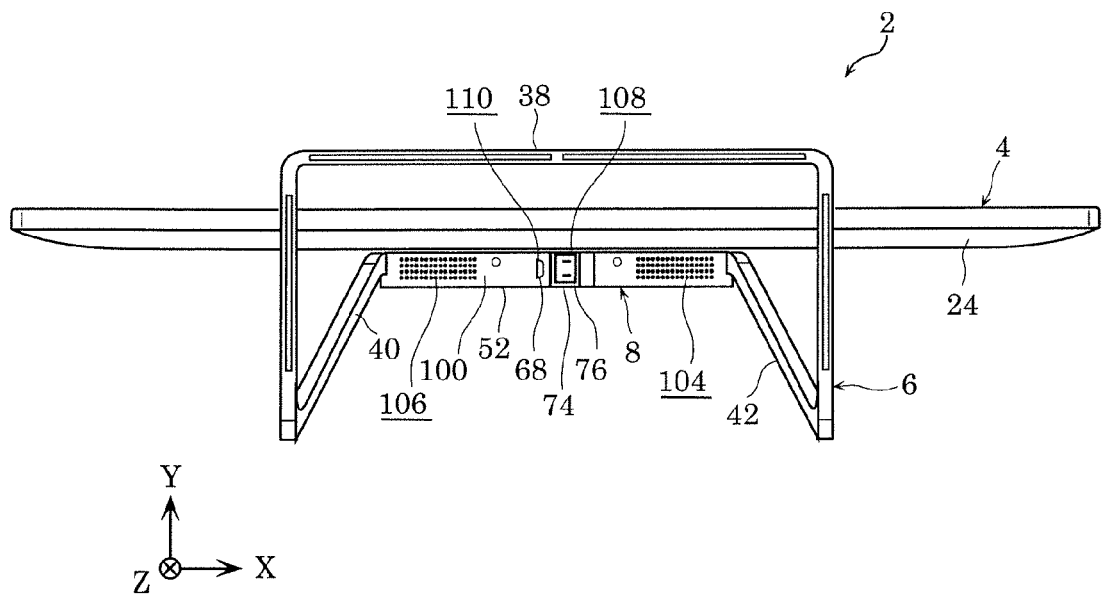
FIG. 5 is a perspective view of a bottom side of the image display device according to the embodiment.

An overall configuration of image display device 2 according to the embodiment will be described first with reference to FIG. 1 to FIG. 5. FIG. 1 is a perspective view of a front side of image display device 2 according to the embodiment. FIG. 2 is a perspective view of the front side of image display device 2 according to the embodiment in a state in which device body 4 is rotated 90° away from the state shown in FIG. 1. FIG. 3 is a perspective view of a rear side of image display device 2 according to the embodiment. FIG. 4 is a diagram showing a lateral side of image display device 2 according to the embodiment. FIG. 5 is a diagram showing a bottom side of image display device 2 according to the embodiment.

As illustrated in FIG. 1 to FIG. 5, image display device 2 is, for example, a rotatable liquid crystal television set. Image display device 2 includes device body 4, stand 6, and support component 8.

As illustrated in FIG. 1 to FIG. 5, device body 4 displays an image and is substantially rectangular and panel-shaped in an XZ-plan view. As illustrated in FIG. 1 and FIG. 2, display surface 10 that is substantially rectangular in the XZ-plan view is disposed on a front surface of device body 4. Note that "substantially rectangular" not only means rectangular in the strict sense of the word, but also includes rectangular with four rounded corners (so-called rounded rectangular), rectangular with four curved sides, etc.

As illustrated in FIG. 1 to FIG. 5, stand 6 supports device body 4 from below and is placed on placement surface 12 (see FIG. 4).

As illustrated in FIG. 3 to FIG. 5, support component 8 rotatably supports device body 4. Support component 8 is fixed to an upper end portion of stand 6 and is disposed on a rear surface of device body 4 (surface on side opposite of display surface 10). This enables device body 4 to rotate 90° between a horizontal orientation in which display surface 10 is in a landscape orientation as illustrated in FIG. 1 and a vertical orientation in which display surface 10 is in a portrait orientation as illustrated in FIG. 2. In other words, as illustrated by arrow 14 in FIG. 1, device body 4 is displaced from the horizontal orientation to the vertical orientation by rotating device body 4, being in its horizontal orientation in FIG. 1, clockwise 90°. However, as illustrated by arrow 16 in FIG. 2, device body 4 is displaced from the vertical orientation to the horizontal orientation by rotating device body 4, being in its vertical orientation in FIG. 2, counter-clockwise 90°.

Note that "display surface 10 is in a landscape orientation" means that long sides of display surface 10 are substantially parallel with the horizontal direction (X-axis) and short sides of display surface 10 are substantially parallel with the vertical direction (Z-axis). However, "display surface 10 is in a portrait orientation" means that the long sides of display surface 10 are substantially parallel with the vertical direction and the short sides of display surface 10 are substantially parallel with the horizontal direction.

The user can put device body 4 in one of the horizontal orientation and the vertical orientation by suitably rotating device body 4 depending on usage thereof, etc. For example, the user puts device body 4 in the horizontal orientation when watching a television program, etc. For example, the user puts device body 4 in the vertical orientation when a smartphone image and the like are displayed on display surface 10.

2. Configuration of Device Body

Figure 6:
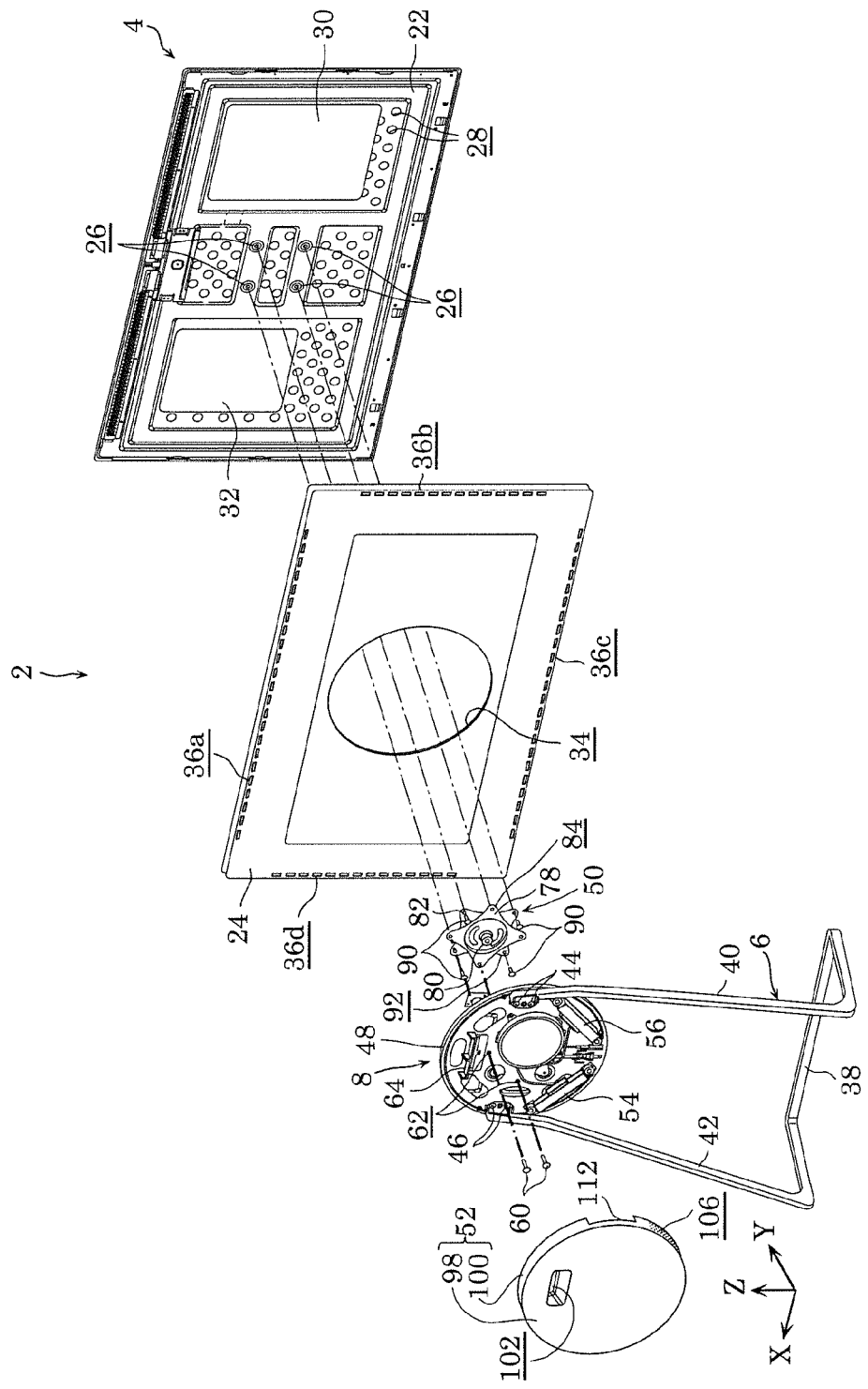
FIG. 6 is an exploded perspective view of the image display device according to the embodiment.
Figure 7:
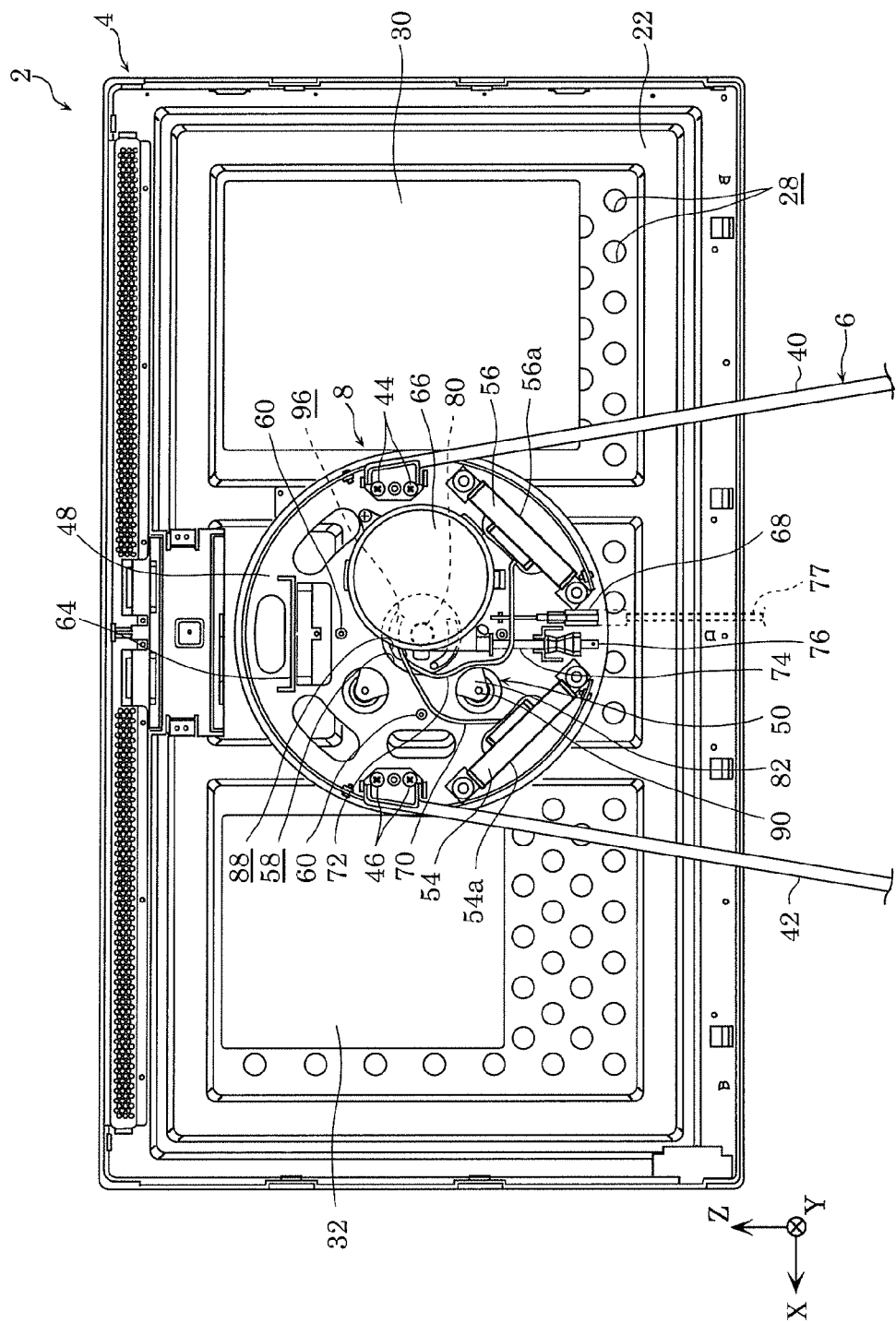
FIG. 7 is a diagram showing the rear side of the image display device according to the embodiment in a state in which a back cover and cover component thereof are omitted.

A configuration of device body 4 will be described next with reference to FIG. 1 to FIG. 7. FIG. 6 is an exploded perspective view of image display device 2 according to the embodiment. FIG. 7 is a diagram showing the rear side of image display device 2 according to the embodiment in a state in which back cover 24 and cover component 52 thereof are omitted.

As illustrated in FIG. 1 to FIG. 7, device body 4 includes display panel 18, a backlight (not illustrated), bezel 20, base plate 22, and back cover 24.

As illustrated in FIG. 1 and FIG. 2, display panel 18 is a so-called liquid crystal cell which consists of liquid crystals sealed between glass plates. Display panel 18 is substantially rectangular and panel-shaped in the XZ-plan view. Display surface 10 for displaying an image is disposed on the front surface of display panel 18.

The backlight is, for example, an edge-lit backlight, and emits light toward the rear surface of display panel 18 (surface on side opposite of display surface 10). Note that the backlight is not limited to being an edge-lit backlight, and may also be, for example, a direct backlight.

As illustrated in FIG. 1 and FIG. 2, bezel 20 is a substantially rectangular frame for protecting a periphery of display panel 18. Bezel 20 covers the periphery of display panel 18. Note that bezel 20 includes, for example, a resin such as polycarbonate.

As illustrated in FIG. 6 and FIG. 7, base plate 22 is a component for supporting the backlight and the like, and is also referred to as a back frame. Base plate 22 is substantially rectangular in the XZ-plan view and is formed, for example, by performing a stamping treatment on sheet metal such as strip steel. A central portion of a rear surface of base plate 22 has screw holes 26 into which screws 90 are screwed. Base plate 22 has through-holes 28 for making image display device 2 lighter.

Display panel 18, the backlight, etc. are supported on a front surface of base plate 22. As illustrated in FIG. 6 and FIG. 7, power supply substrate 30, control substrate 32 (each an example of a circuit board), etc. are supported on the rear surface of base plate 22. For example, a power supply circuit for generating electric power to be supplied to display panel 18, the backlight, etc. is mounted on power supply substrate 30. For example, electronic components for forming the power supply circuit, e.g. a capacitor and a resistance element, are mounted on power supply substrate 30. For example, a control circuit for controlling display panel 18, the backlight, a pair of speakers 54 and 56 (described later), etc. is mounted on control substrate 32. For example, electronic components for forming the control circuit, e.g. an integrated circuit (IC) and a gyroscope sensor, are mounted on control substrate 32. Note that in FIG. 6 and FIG. 7, illustration of the electronic components of power supply substrate 30 and control substrate 32 are omitted for the sake of description.

As illustrated in FIG. 3 and FIG. 6, back cover 24 covers the rear surface of base plate 22 and forms the rear surface of device body 4. As illustrated in FIG. 6, a central portion of back cover 24 has a circular opening 34 for exposing the central portion of base plate 22. Note that back cover 24 includes, for example, a resin such as polycarbonate.

Figure 9:
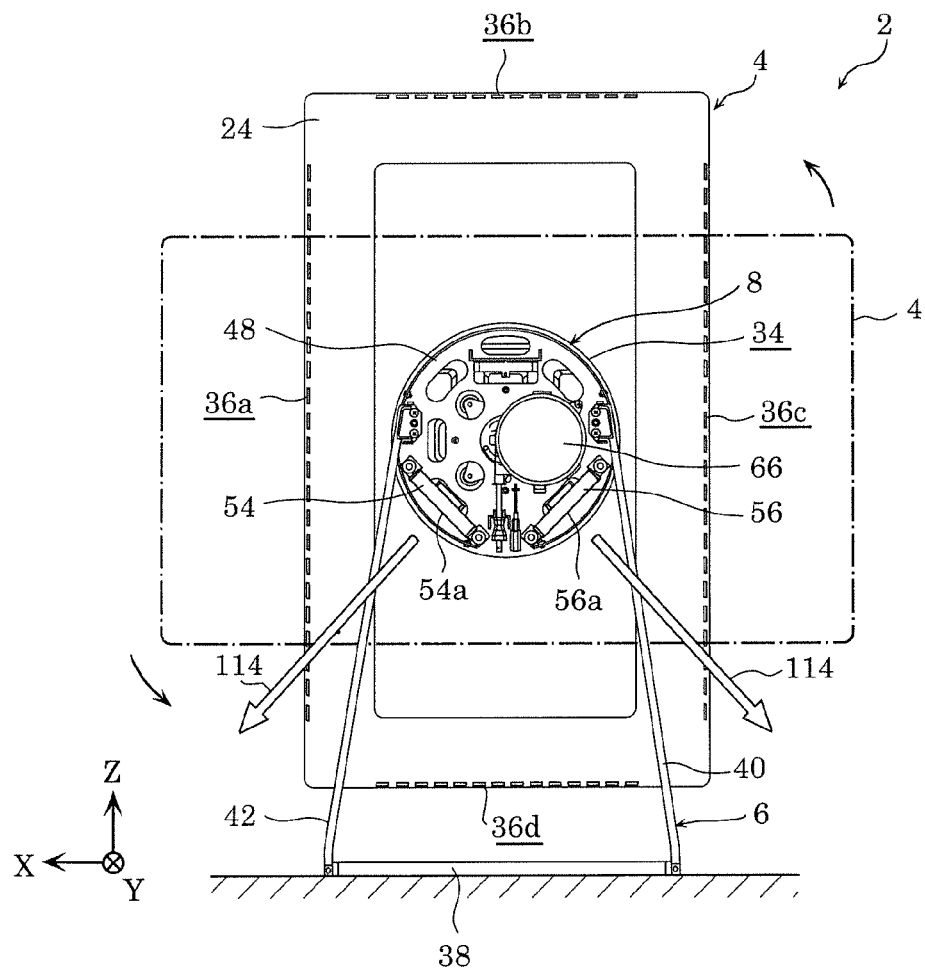
FIG. 9 is a diagram showing the rear side of the image display device according to the embodiment in a state in which the cover component thereof is omitted.

Four sides of back cover 24 respectively have exhaust hole groups 36a, 36b, 36c, and 36d. Exhaust hole groups 36a and 36c each have exhaust holes spaced along a corresponding one of a pair of long sides of back cover 24. Exhaust hole groups 36b and 36d each have exhaust holes spaced along a corresponding one of a pair of short sides of back cover 24. As illustrated in FIG. 3, while device body 4 is in the horizontal orientation, air from outside device body 4 is sucked in through the lower side exhaust hole group 36c and air inside device body 4 is exhausted from the upper side exhaust hole group 36a. However, as illustrated in FIG. 9, which will be described later, while device body 4 is in the vertical orientation, air from outside device body 4 is sucked in through the lower side exhaust hole group 36d and air inside device body 4 is exhausted from the upper side exhaust hole group 36b.

3. Configuration of Stand

A configuration of stand 6 will be described next with reference to FIG. 1 to FIG. 7.

As illustrated in FIG. 1 to FIG. 5, stand 6 includes base portion 38 and a pair of bars 40 and 42. Base portion 38 is substantially U-shaped and is placed on placement surface 12 (see FIG. 4). The pair of bars 40 and 42 extend upward (positive direction of the Z-axis) from either end portion of base portion 38. As illustrated in FIG. 6 and FIG. 7, each upper end portion of the pair of bars 40 and 42 is fixed with screws 44 and 46 to a periphery at a rear surface of support plate 48 (described later) of support component 8. Note that stand 6 is formed by, for example, bending a metallic pipe that includes iron, aluminum, or the like.

As illustrated in FIG. 4, the pair of bars 40 and 42 extend while curving in substantially a V-shape. With this, display surface 10 of device body 4 is inclined backward (negative direction of the Y-axis) with respect to a vertical direction at predetermined angle θ (e.g. approximately 4°). In other words, display surface 10 of device body 4 is slightly aimed obliquely upward.

4. Configuration of Support Component

Figure 8:
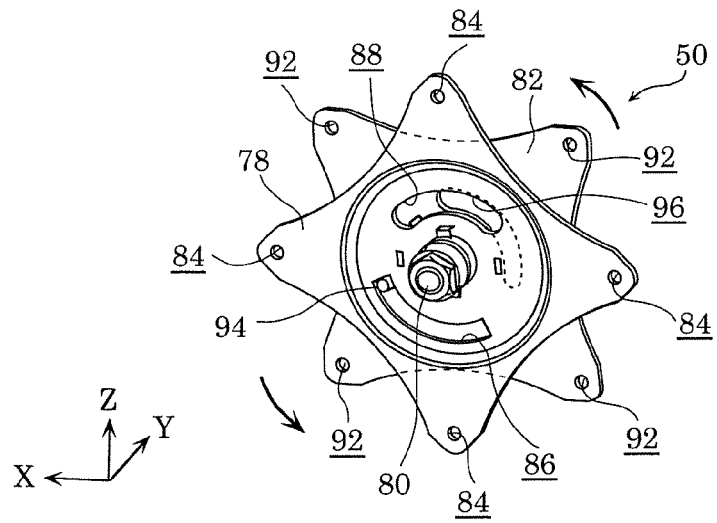
FIG. 8 is a perspective view showing a rotation mechanism of a support component according to the embodiment isolated.

A configuration of support component 8 will be described next with reference to FIG. 3 to FIG. 8. FIG. 8 is a perspective view showing rotation mechanism 50 of support component 8 according to the embodiment isolated.

As illustrated in FIG. 6, support component 8 includes support plate 48, rotation mechanism 50, and cover component 52.

As illustrated in FIG. 6 and FIG. 7, support plate 48 supports the pair of speakers 54 and 56 and the like, and is circular and plate-shaped in the XZ-plan view. As illustrated in FIG. 7, a radial central portion of support plate 48 has a circular hole 58. As illustrated in FIG. 6, insertion holes 62 through which screws 60 pass are disposed around hole 58 of support plate 48 (see FIG. 7). For example, reinforcement protrusion 64 is formed on a rear surface of support plate 48 by performing a machining treatment and the like on metal. Support plate 48 is disposed in opening 34 of back cover 24 of device body 4 and is rotatably supported on the rear surface of base plate 22 via rotation mechanism 50. Support plate 48 is fixed to the upper end portions of the pair of bars 40 and 42 with screws 44 and 46. Note that support plate 48 is formed, for example, by performing a stamping treatment on sheet metal such as strip steel.

As illustrated in FIG. 7, the pair of speakers 54 and 56, cord reel 66, and High-Definition Multimedia Interface (HDMI)® terminal 68 (an example of a external device connection terminal) are supported on the rear surface of support plate 48.

The pair of speakers 54 and 56 are, for example, two-channel stereo speakers for outputting stereo sound. The pair of speakers 54 and 56 respectively include sound-emitting surfaces 54a and 56a for emitting sound. Sound-emitting surface 54a of speaker 54 emits right-channel sound and sound-emitting surface 56a of speaker 56 emits left-channel sound. The pair of speakers 54 and 56 are electrically connected to control substrate 32 by, respectively, a pair of electric wires 70 and 72. An arrangement of the pair of speakers 54 and 56 is described later.

Cord reel 66 is a component for accommodating power cord 74, which is electrically connected to power supply substrate 30, so that it can be wound and reeled out. When using image display device 2, power cord 74 is reeled out from cord reel 66 and plug 76 of power cord 74 is plugged into an outlet disposed indoors. When image display device 2 is not being used, power cord 74 can be wound and accommodated in cord reel 66.

HDMI® terminal 68 is a connection terminal into which an HDMI® cable (not illustrated) is plugged, and is electrically connected to control substrate 32. Image display device 2 is electrically connected to an external device (not illustrated), e.g. a smartphone or a Blu-ray Disc® (BD) player, via HDMI® cable 77 (example of a cable) plugged into HDMI® terminal 68. Note that HDMI® terminal 68 faces downward (negative direction of the Z-axis) to retain HDMI® cable 77 that points to placement surface 12 (see FIG. 3) and is plugged into HDMI® terminal 68.

Rotation mechanism 50 is a mechanism for rotatably coupling device body 4 and support plate 48. As illustrated in FIG. 7 and FIG. 8, rotation mechanism 50 includes fixed plate 78, rotation shaft 80, and rotation plate 82.

As illustrated in FIG. 8, fixed plate 78 is substantially cross-shaped. Each corner of fixed plate 78 has screw hole 84 into which screw 60 is screwed. As illustrated in FIG. 6, fixed plate 78 is fixed to a front surface of support plate 48 by screwing screws 60 into screw holes 84 of fixed plate 78 extending through insertion holes 62 of support plate 48. As illustrated in FIG. 8, fixed plate 78 has restriction slit 86 for restricting a rotation angle range of device body 4 to 90° with respect to stand 6. Restriction slit 86 is arc-shaped around rotation shaft 80. Fixed plate 78 has insertion slit 88 for inserting the pair of electric wires 70 and 72 therethrough. Insertion slit 88 is arc-shaped around rotation shaft 80.

Rotation shaft 80 is fixed to a central portion of fixed plate 78. As illustrated in FIG. 7, rotation shaft 80 is disposed on the radial central portion of support plate 48 and extends along the Y-axis.

As illustrated in FIG. 8, rotation plate 82 is rotatably supported by rotation shaft 80 and faces fixed plate 78. Rotation plate 82 is substantially cross-shaped. Each corner of rotation plate 82 has insertion hole 92 for inserting screws 90 therethrough. As illustrated in FIG. 6, rotation plate 82 is fixed to the rear surface of base plate 22 by screwing screws 90 into screw holes 26 of base plate 22 extending through insertion holes 92 of rotation plate 82.

As illustrated in FIG. 8, rotation plate 82 has restriction protrusion 94 for restricting the rotation angle range of device body 4 to 90° with respect to stand 6. Restriction protrusion 94 is movably inserted through restriction slit 86 of fixed plate 78. Restriction protrusion 94 moves along restriction slit 86 when rotation plate 82 rotates with respect to fixed plate 78. Since a movement range of restriction protrusion 94 is restricted by restriction slit 86, the rotation angle range of rotation plate 82 is restricted to 90° with respect to fixed plate 78.

Rotation plate 82 has insertion slit 96 for inserting the pair of electric wires 70 and 72 therethrough. Insertion slit 96 is arc-shaped around rotation shaft 80. Insertion slit 96 of rotation plate 82 overlaps at least a portion of insertion slit 88 of fixed plate 78 at all times regardless of a rotation angle position of rotation plate 82 with respect to fixed plate 78. As illustrated in FIG. 7, insertion slit 88 of fixed plate 78 and insertion slit 96 of rotation plate 82 overlap hole 58 of support plate 48. With this, the pair of electric wires 70 and 72 are inserted through hole 58 of support plate 48, insertion slit 88 of fixed plate 78, and insertion slit 96 of rotation plate 82.

The above rotation mechanism 50 enables device body 4 to rotate about rotation shaft 80 between, with respect to stand 6, the horizontal orientation and the vertical orientation. The rotation angle range of device body 4 is restricted to 90° with respect to stand 6 by the above restriction protrusion 94 and restriction slit 86. Note that rotation mechanism 50 may also include a stopper mechanism for retaining device body 4 in the horizontal orientation and the vertical orientation.

As illustrated in FIG. 3 and FIG. 4, cover component 52 is circular in the XZ-plan view, covers support plate 48 (see FIG. 6), and is attached to a periphery of opening 34 of back cover 24. Cover component 52 includes a discoid body 98 and a cylindrical lateral wall 100 disposed at a periphery of body 98. Note that cover component 52 includes, for example, a resin such as polycarbonate.

Body 98 (i.e., rear side of support component 8) includes recess 102 that serves as a handle. An upper lateral surface of recess 102 is disposed along reinforcement protrusion 64 of support plate 48. This makes it possible to limit damage to cover component 52 when, for example, the user's fingers grab recess 102 since it is possible to strengthen recess 102.

As illustrated in FIG. 5, lateral wall 100 has a pair of sound-emitting hole groups 104 and 106 for emitting the sound from the pair of speakers 54 and 56 exterior to support component 8. The pair of sound-emitting hole groups 104 and 106 respectively face the pair of speakers 54 and 56. The pair of sound-emitting hole groups 104 and 106 each include sound-emitting holes spaced along a circumference of lateral wall 100.

As illustrated in FIG. 5, a lower end portion of lateral wall 100 has cord hole 108 for reeling out power cord 74 and terminal hole 110 for exposing HDMI® terminal 68 to an exterior thereof. Note that cord hole 108 faces downward so that power cord 74 is reeled out toward placement surface 12 (see FIG. 3). As illustrated in FIG. 6, lateral wall 100 has a pair of cutouts 112 for allowing each upper end portion of the pair of bars 40 and 42 of stand 6 to pass through. Note that in FIG. 6, only one of the pair of cutouts 112 is illustrated.

5. Arrangement of Speakers

An arrangement of the pair of speakers 54 and 56 will be described next with reference to FIG. 4, FIG. 7, and FIG. 9. FIG. 9 is a diagram showing the rear side of image display device 2 according to the embodiment in a state in which cover component 52 thereof is omitted.

As illustrated in FIG. 7, the pair of speakers 54 and 56 are disposed in bilaterally symmetrical positions with respect to rotation shaft 80. Note that "bilaterally symmetrical" means symmetrical in the left-right direction (X-axis), does not necessarily mean perfect symmetry, and an error degree of, for example, a common difference away from perfect symmetry is permissible. "Left-right direction" means substantially parallel with placement surface 12 in a front view of display surface 10 of device body 4.

The pair of speakers 54 and 56 emits sound toward placement surface 12. To be specific, as illustrated in FIG. 7, sound-emitting surface 54a of speaker 54 and sound-emitting surface 56a of speaker 56 are 45° inclined with respect to the vertical direction. With this, as shown with arrow 114 in FIG. 9, the sound from the pair of speakers 54 and 56 is outputted obliquely downward in laterally (X-axis) opposite directions.

As illustrated in FIG. 9, the pair of speakers 54 and 56 are disposed on support plate 48 fixed to stand 6. Thus, a positional relationship between the user and the pair of speakers 54 and 56 does not change even when, for example, device body 4 is rotated with respect to stand 6. As a result, the way the sound from the pair of speakers 54 and 56 sounds to the user does not change.

As stated above, since display surface 10 of device body 4 is inclined backward with respect to the vertical direction at predetermined angle θ, the sound from the pair of speakers 54 and 56 is emitted frontward (positive direction of the Y-axis) and obliquely downward in the front-back direction (Y-axis), as indicated by arrow 116 in FIG. 4. With this, the sound from the pair of speakers 54 and 56 is transmitted toward the user after being reflected on placement surface 12.

6. Advantageous Effects

In the present embodiment, image display device 2 includes device body 4 having the front surface with display surface 10 that is substantially rectangular and is for displaying an image; stand 6 that is placed on placement surface 12 and supports device body 4; support component 8 that is fixed to stand 6 is disposed on the rear surface of device body 4, and rotatably supports device body 4 about rotation shaft 80 between the horizontal orientation in which display surface 10 is in the landscape orientation and the vertical orientation in which display surface 10 is in the portrait orientation; and speaker 54 (56) that is supported by support component 8 and is disposed on the rear surface of device body 4 via support component 8. Speaker 54 (56) emits sound toward placement surface 12.

Thus, since speaker 54 (56) is disposed on support component 8 fixed to stand 6, the positional relationship between the user and speaker 54 (56) does not change even when, for example, device body 4 is rotated with respect to stand 6. As a result, it is possible to limit how a change in the way the sound from speaker 54 (56) sounds to the user. Since speaker 54 (56) is disposed on the rear surface of device body 4 via support component 8, it is possible to make the appearance of image display device 2 compact and simple without speaker 54 (56) being in the user's line of vision in the front view of image display device 2. Since speaker 54 (56) emits sound toward placement surface 12, the sound from speaker 54 (56) is transmitted toward the user after being reflected on placement surface 12. As a result, it is possible to efficiently transmit the sound from speaker 54 (56) toward the user.

In the present embodiment, display surface 10 of device body 4 is inclined with respect to the vertical direction. With this, it is easier to transmit the sound from speaker 54 (56) toward the user after being reflected on placement surface 12. As a result, it is possible to more efficiently transmit the sound from speaker 54 (56) toward the user.

In the present embodiment, the pair of speakers 54 and 56 are disposed. The pair of speakers 54 and 56 respectively include sound-emitting surfaces 54a and 56a that are inclined with respect to the vertical direction and output the sound toward placement surface 12. The sound from sound-emitting surfaces 54a and 56a of the pair of speakers 54 and 56 is outputted obliquely downward in laterally opposite directions.

This makes it possible to more efficiently transmit the sound from the pair of speakers 54 and 56 toward the user.

In the present embodiment, the pair of speakers 54 and 56 are disposed in bilaterally symmetrical positions with respect to rotation shaft 80.

This makes it possible to transmit the sound from the pair of speakers 54 and 56 toward the user well-balanced left and right.

In the present embodiment, device body 4 has exhaust hole groups 36a, 36b, 36c, and 36d that are disposed on each of the four sides of device body 4 and exhaust air inside device body 4.

With this, while device body 4 is in the horizontal orientation, air from outside device body 4 is sucked in through the lower side exhaust hole group 36c and air inside device body 4 is exhausted from the upper side exhaust hole group 36a. However, while device body 4 is in the vertical orientation, air from outside device body 4 is sucked in through the lower side exhaust hole group 36d and air inside device body 4 is exhausted from the upper side exhaust hole group 36b. As a result, it is possible to efficiently exhaust the air inside device body 4 even when device body 4 is retained in either one of the horizontal orientation and the vertical orientation.

In the present embodiment, support component 8 includes HDMI® terminal 68 that is disposed on the lower end portion of lateral wall 100 of support component 8. HDMI® terminal 68 faces downward to retain HDMI® cable 77 that points to placement surface 12 and is connected to HDMI® terminal 68.

This makes it possible to easily perform the wiring of HDMI® cable 77.

In the present embodiment, support component 8 includes cord hole 108 for reeling out power cord 74, cord hole 74 being disposed on the lower end portion of lateral wall 100 of support component 8; and cord reel 66 on which power cord is 74 wound, cord reel 66 being disposed in support component 8. Cord hole 108 faces downward so that power cord 74 is reeled out toward placement surface 12.

This makes it possible to easily perform the wiring of HDMI® cable 74.

In the present embodiment, support component 8 includes recess 102 that is disposed on a rear surface side of support component 8, and serves as a handle for the user.

This enables the user to easily carry image display device 2 by, for example, grabbing recess 102 with their fingers, etc.

In the present embodiment, image display device 2 further control substrate 32 that is disposed in device body 4; and electric wire 70 (72) that electrically connected speaker 54 (56) and control substrate 32. Support component 8 includes support plate 48 that is fixed to stand 6, supports speaker 54 (56) and rotation shaft 80, and has hole 58 through which electric wire 70 (72) passes.

This makes it possible to maintain electric wire 70 (72) in a favorable wiring state even when device body 4 is rotated with respect to stand 6. VARIATION, etc.

The embodiment is described above as an example of the technique disclosed in the present application. However, the technique in the present disclosure is not limited to the above embodiment; various changes, substitutions, additions, omissions, etc., may be made to the embodiment. Each component included in the above embodiment may be combined to achieve new embodiments.

Hereinafter, other embodiments will be exemplified.

In the above embodiment, image display device 2 is a liquid crystal television set, but is not limited thereto, and may also be, for example, a liquid crystal monitor for personal computers. Image display device 2 may also be, for example, an organic electroluminescent (EL) monitor.

In the above embodiment, the pair of speakers 54 and 56 are disposed on support component 8, but are not limited thereto, and, for example, only one speaker or at least three speakers may also be disposed.

In the above embodiment, the rotation angle range of device body 4 is restricted to 90° with respect to stand 6, but is not limited thereto, and the rotation angle range may also be restricted to, for example, 180°.

In the above embodiment, support plate 48 is formed by performing a stamping treatment on sheet metal, but may also be formed by performing a machining treatment.

The above embodiments have been presented as examples of techniques according to the present disclosure. The accompanying drawings and the detailed description are provided for this purpose.

Therefore, the components described in the accompanying drawings and the detailed description include, in addition to components essential to overcoming problems, components that are not essential to overcoming problems but are included in order to exemplify the technique described above. Thus, those non-essential components should not be deemed essential due to the mere fact that they are illustrated in the accompanying drawings and described in the detailed description.

The above embodiments are for providing examples of the technique in the present disclosure, and thus various modifications, substitutions, additions, and omissions are possible in the scope of the claims and equivalent scopes thereof.

INDUSTRIAL APPLICABILITY

The image display device of the present disclosure can be used for, for example, a rotatable liquid crystal television set.

REFERENCE MARKS IN THE DRAWINGS

2 Image display device
4 Device body
6 Stand
8 Support component
10 Display surface
12 Placement surface
14, 16, 114, 116 Arrow
18 Display panel
20 Bezel
33 Base plate
24 Back cover
26, 84 Screw hole
28 Through-hole
30 Power supply substrate
32 Control substrate
34 Opening
36a, 36b, 36c, 36d Exhaust hole group
38 Base portion
40, 42 Bar
44, 46, 60, 90 Screw
48 Support plate
50 Rotation mechanism
52 Cover component
54, 56 Speaker
54a, 56a Sound-emitting surface 58 Hole
62, 92 Insertion hole
64 Reinforcement protrusion
66 Cord reel
68 HDMI® terminal
70, 72 Electric wire
74 Power cord
76 Plug
77 HDMI® cable
78 Fixed plate
80 Rotation shaft
82 Rotation plate
86 Restriction slit
88, 96 Insertion slit
94 Restriction protrusion
98 Body
100 Lateral wall
102 Recess
104, 106 Sound-emitting hole group
108 Cord hole
110 Terminal hole
112 Cutout

The invention claimed is:

1. An image display device, comprising:
    a device body having a front surface with a display surface that is substantially rectangular and is for displaying an image;
    a stand that is placed on a placement surface and supports the device body;
    a support component that is fixed to an upper end portion of the stand and disposed on a rear surface on a side opposite to the display surface of the device body, and rotatably supports the device body about a rotation shaft between a horizontal orientation in which the display surface is in a landscape orientation and a vertical orientation in which the display surface is in a portrait orientation; and
    a speaker that is supported by the support component and is disposed on the rear surface of the device body via the support component, the speaker being located at a position in which the speaker overlaps the device body when viewed in a direction perpendicular to the display surface of the device body, wherein
    the speaker emits sound toward the placement surface.

2. The image display device according to claim 1, wherein the display surface of the device body is inclined with respect to a vertical direction.

3. The image display device according to claim 2, wherein
    the speaker comprises a pair of speakers,
    each speaker in the pair of speakers has a sound-emitting surface that is inclined with respect to the vertical direction and outputs sound toward the placement surface, and
    the sound from the sound-emitting surface of each speaker in the pair of speakers is outputted obliquely downward in laterally opposite directions.

4. The image display device according to claim 3, wherein the pair of speakers are disposed in bilaterally symmetrical positions with respect to the rotation shaft.

5. The image display device according to claim 1, wherein the device body has exhaust holes that are disposed on each of four sides of the device body and exhaust air inside the device body.

6. The image display device according to claim 1, wherein
    the support component includes an external device connection terminal that is disposed on a lower end portion of a lateral wall of the support component, and
    the external device connection terminal faces downward to retain a cable that points to the placement surface and is connected to the external device connection terminal.

7. The image display device according to claim 1, wherein
    the support component includes:
        a cord hole for reeling out a power cord, the cord hole being disposed on a lower end portion of a lateral wall of the support component; and
        a cord reel on which the power cord is wound, the cord reel being disposed in the support component, and
    the cord hole faces downward so that the power cord is reeled out toward the placement surface.

8. The image display device according to claim 1, wherein the support component includes a recess that is disposed on a rear surface side of the support component, and serves as a handle for a user.

9. The image display device according to claim 1, further comprises:
    a circuit board that is disposed in the device body; and
    an electric wire that electrically connects the speaker and the circuit board, wherein
    the support component includes a support plate that is fixed to the upper end portion of the stand, supports the speaker and the rotation shaft, and has a hole through which the electric wire passes.

* * * * *